United States Patent [19]

Bieser et al.

[11] 3,987,572

[45] Oct. 26, 1976

[54] TIDAL OPERATED PLANKTON HARVESTER

[75] Inventors: Albert H. Bieser, Garland; Eric L. Rognlie, Dallas; William B. Stuhler, Plano, all of Tex.

[73] Assignee: Plankton Resources, Inc., Garland, Tex.

[22] Filed: May 15, 1975

[21] Appl. No.: 577,647

[52] U.S. Cl. .................................. 43/4.5; 43/6.5
[51] Int. Cl.² .................................................... A01K 71/00
[58] Field of Search ................. 43/8, 9, 44.5, 6.5, 43/103, 104, 13; 73/424; 209/156, 270, 288

[56] References Cited
UNITED STATES PATENTS

| | | | |
|---|---|---|---|
| 3,412,498 | 11/1968 | Niskin | 43/8 |
| 3,461,591 | 8/1969 | Brown et al. | 43/8 |
| 3,475,846 | 11/1969 | Springston, Jr. | 43/9 |
| 3,729,855 | 5/1973 | Niskin | 43/8 |

*Primary Examiner*—Warner H. Camp
*Attorney, Agent, or Firm*—Richards, Harris and Medlock

[57] ABSTRACT

A plankton harvester includes a surface float adapted to be secured to face tidal flow with an open subsurface cylinder secured to the flat and with the fore/aft axis parallel to the axis of said cylinder. A rotatable conical net structure is coaxial with the cylinder with the apex thereof at the mouth of the cylinder and the cone base engaging the opposite end to force fluid passing through the cylinder to pass through the net and deposit solids from the fluid on the surface of the net. Vanes in the conical structure rotates the cone at a rate dependent upon flow. Powered suction means adjacent to a linear surface segment of the net removes solids from the net surface. A storage chamber associated with the float is flow coupled to the suction means to store solids removed from the net surface.

8 Claims, 5 Drawing Figures

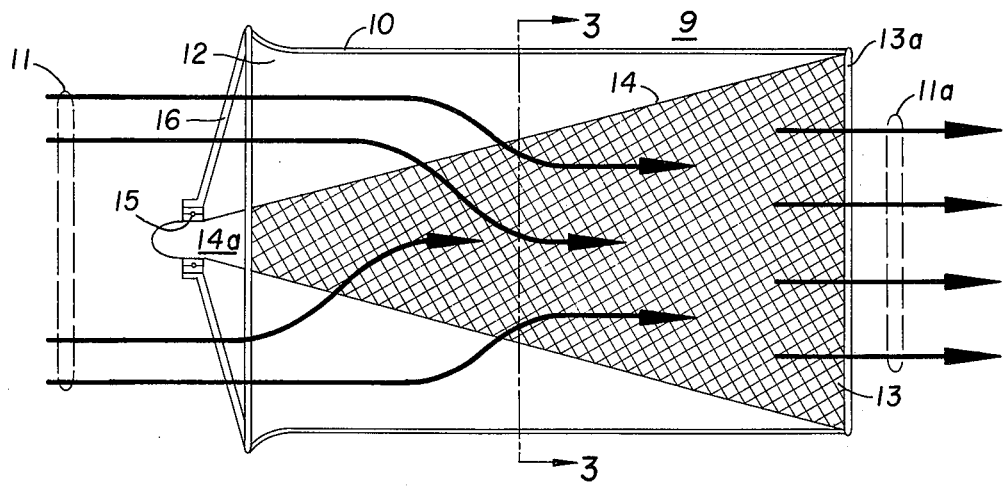
FIG. 2
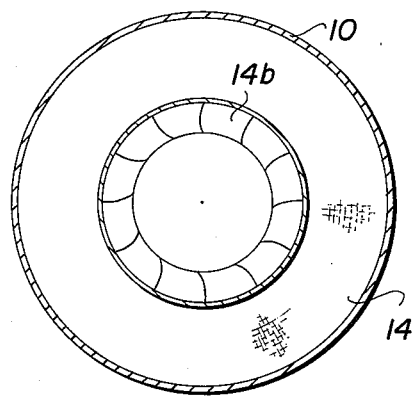
FIG. 3
FIG. 1
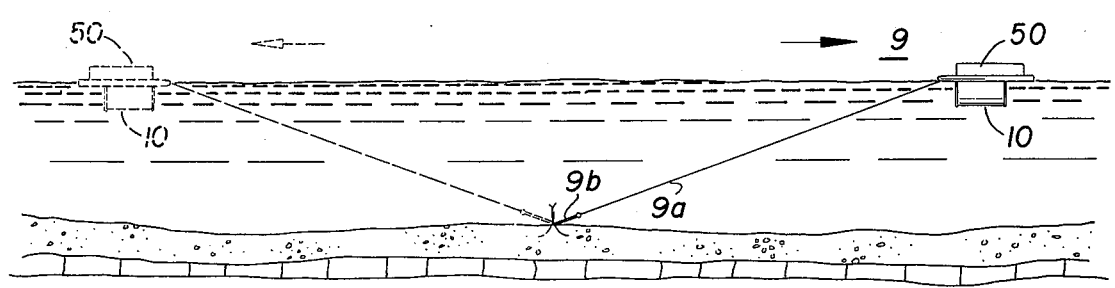

TIDAL OPERATED PLANKTON HARVESTER

This invention relates to the commercial harvesting of marine life, specifically plankton, and more particularly to a unit that is powered in a major aspect by tidal energy.

The existence of large masses of plankton in the ocean has beckoned many who would utilize plankton as a source of protein for nutritional purposes. As is well known, plankton are minute marine organisms that vary in size depending upon the environment in which they live. In tropical areas, plankton can be harvested by screens which pass particles below 80 microns in size. In the north Atlantic where the plankton grow larger, 200 micron screens are suitable. Various proposals have been made for the collection of plankton in large quantities as to provide a significant source of nutrition. In any such system, it is highly desirable that energy expended in the process of collecting the plankton be minimized with efficiency of removal of the desired organisms from the marine environment maximized.

The present invention is directed to a system and a method of harvesting plankton in which tidal energy is employed as a power source for certain of the operations involved in the collection system. More particularly, in accordance with the invention, a plankton harvester is provided which includes a subsurface flow director adapted to be maintained in a horizontal orientation and anchored to have the mouth thereof facing tidal flow at all times. A rotatable conical net structure is coaxially mounted within the flow director with the apex thereof at the mouth of the director and closing the opposite end of the director to force fluid passing through the director to pass through the conical net. Structure is provided on the conical net to rotate the net at a rate depending upon the flow of fluid through the net. A powered suction unit having the mouth thereof adjacent to a linear surface segment of the net serves to remove the solids from the surface as the net rotates by the mouth of the suction system. A floatation storage chamber is associated with the system flow coupled to the suction unit to receive and store solids removed from the net.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIG. 1 illustrates tidal effects employed in the present invention;

FIG. 2 is a diagrammatic illustration of a portion of the harvester system of FIG. 1;

FIG. 3 is a sectional view taken along lines 3—3 of FIG. 2 to show vanes within the cone unit of FIG. 1;

Figure 4:
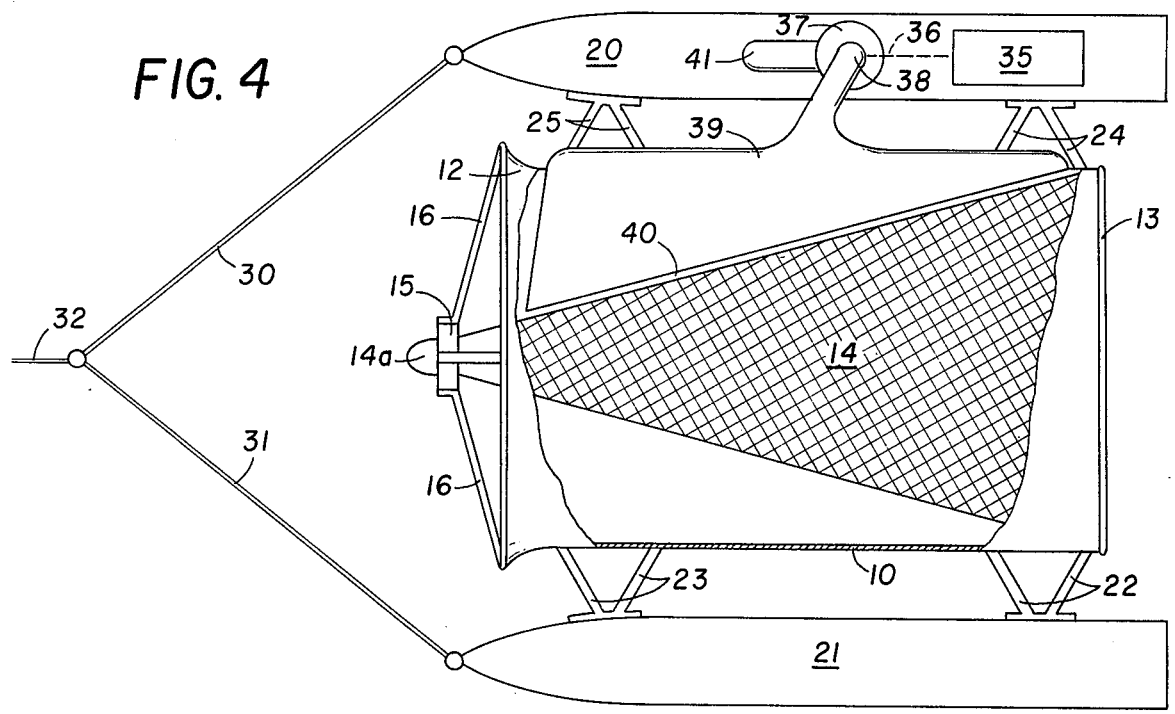
FIG. 4 is a top view of a tethered system including the units of FIG. 1.

Referring to FIG. 1 a unit 9 is buoyantly maintained at the surface of the sea and supports at a subsurface position a flow director in the form of an open hollow cylinder 10 whose longitudinal axis is parallel to the fore/aft axis of the unit 9. The bow of unit 9 is tethered by cable 9a to an anchor 9b. Operation of the tethered unit is such that the mouth of the cylinder 10 always faces upstream of the tidal flow and can swing on cable 9a as indicated by the dotted lines of FIG. 1 to satisfy this condition. Thus tethered, a flow of water will be maintained through cylinder 10.

Referring now to FIG. 2, a portion of the plankton harvester of FIG. 1 of the present invention is illustrated. Open cylinder 10 is to be anchored and supported so that it faces upstream to the flow of tidal currents. Tidal current flow is indicated by the flow lines 11. The water flow enters the mouth 12 of cylinder 10 and leaves through the trailing end 13. The mouth 12 is dished slightly outward, slightly enlarged, to enhance liquid flow through the cylinder 10. A cone support structure 14 is mounted in cylinder 10. Cone 14 is rotatably mounted in cylinder 10 as by bearing 15 supported by spokes 16. The nose 14a of cone 14 is closed. However, the rest of cone 14 is covered by a fine net through which the water 11 flows to emerge from the cylinder as indicated by the flow lines 11a after having passed through the sieve or net on the surface of cone 14. Preferably the net on cone 14 will be of size as to prevent plankton passing therethrough so that the plankton are deposited as a layer on the surface of the net on cone 14. Cone 14 is also provided with suitable guides or rotatable supports at the periphery 13a of the trailing end 13 so that cone 14 can rotate freely within cylinder 10.

As indicated in FIG. 3, the interior of cone 14 is provided with vanes 14b so that the water flow, as indicated by flow line 11, impinges vanes 14b and thus cause cone 14 to rotate at a rate dependent upon the rate of flow of water through cylinder 10. Thus, with the cylinder 10 anchored in space relative to the flow therethrough, plankton entrained in the water flow passing through the net on cone 14 will be deposited on the net. Such a deposition action will take place whether or not there is rotation of cone 14. However, as will be shown, the rotation of cone 14 is utilized in connection with the harvesting or removal of the plankton from the conical net.

This action is best shown in FIG. 4 in which the cylinder 10 is shown mounted on a float system 9 including pontoons 20 and 21. The cylinder 10 is secured from pontoons 20 and 21 by struts 22–25. Pontoons 20 and 21 are connected at their respective bows by cables 30 and 31, respectively, which in turn are connected to anchor cable 9a which is part of the mooring system. As anchored, the pontoon system carrying the cylinder 10 will respond to changes in the direction of the tidal currents and will always be positioned so that water flow will be through the cylinder 10 from the mouth 12 to the trailing port 13. Cylinder 10 will always be maintained submerged with the pontoons 20 and 21 surface oriented.

The pontoon system is provided with a suitable mechanical powered source 35 which is mechanically coupled by linkage 36 to a pump 37. The input 38 leading to pump 37 extends from a pickup nozzle 39. The pickup nozzle 39 has an elongated relatively narrow hollow mouth 40 which is spaced from but closely adjacent to a linear segment of the surface of the net on cone 14. Thus, the flow of water through the nozzle 39 under the impetus of pump 37 sucks the layer of plankton and any other solids from the surface of the net on cone 14 and deposits the same through the pump outlet 41 into tanks located in or otherwise associated with the pontoons 20 and 21. The rotation of the cone 14 under the power provided by tidal flow through cylinder 10 thus exposes the entire surface of the net to the suction forces at the mouth 40 of nozzle 39 so that the harvest and storage of plankton in the holding tanks is a continuous function, continuously exposing clean net surfaces to the flow of plankton carrying fluid through cylinder 10.

Figure 5:
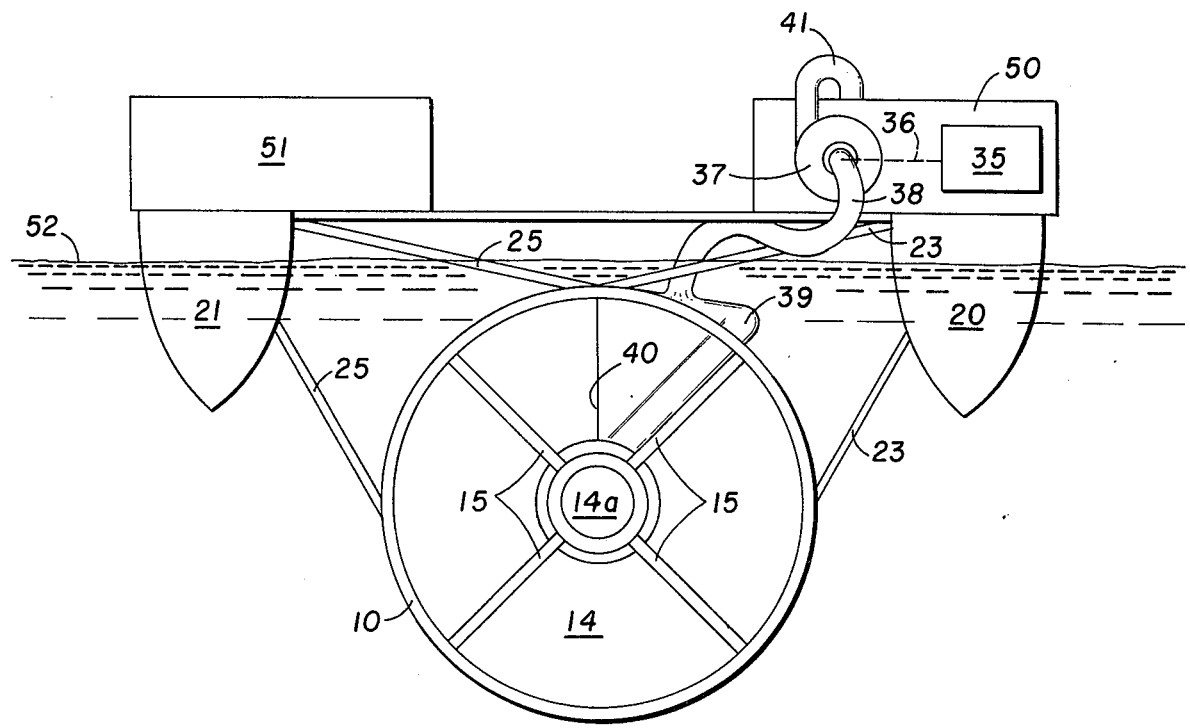
FIG. 5 is a front view of the system of FIG. 3.

FIG. 5 is a front view of the system of FIG. 1 wherein the pontoons 20 and 21 support surface structures 50 and 51 which may be holding tanks which are net lined so as to permit flow therefrom of water introduced by pump 37 while retaining the plankton. The mouth 40 of the suction nozzle 39 is rectangular and extends sustantially the entire length of cone 14. Cylinder 10 is maintained at a position below the water line 52 with the pontoons 20 and 21 providing the necessary support.

In practice, the cylinder 10 would be of the order of 10 to 20 ft. in diameter and would be supported at a depth suitable for the harvesting of the particular type of plankton dictated by the environment in which the system operates. Phyto type plankton are surface units of the vegetable type. In the harvest of such plankton, near surface support of the cylinder 10 would be dictated. Zoo type plankton characteristically are found at greater depths so that the cylinder 10 would be positioned accordingly. It may be operated from surface locations to as deep as 50 to 75 ft. For the deeper sites, the supporting structure would be modified to provide the necessary stability. It will be preferred that the cylinder operate no closer than about 5 to 6 ft. above the bottom.

Thus, in accordance with the present invention, the plankton harvester includes a surface float system 20, 21 adapted to be secured as by the tethering system 30, 31 and 32 to face upstream the tidal flow passing thereby. An open subsurface flow director 10 is secured horizontally to the floats 20, 21 with the fore/aft axis of director 10 parallel to the fore/aft axis of the float system. A rotatable conical net supporting structure 14 is coaxial with the director 10. The apex 14a is at the mouth of director 10 with the trailing or base of the cone closing director 10 and forcing fluid to pass through the net on the surface of cone 14, thereby to deposit solids from the fluid onto the surface of the net. Vane structure within the cone 14 rotates the same at a rate dependent upon the flow of fluid therethrough. A powered suction unit having the input adjacent to the surface of cone 14 removes solids from the surface of the net as it rotates past the mouth thereof. A storage chamber associated with the float system is flow coupled as through pump 37 to the suction nozzle 39 to receive and store the solids removed from the conical unit.

A plurality of units such as shown in the figures may be tethered in a given marine area for convenient periodic service by a collector barge or boat. Such a barge or boat would empty the storage units 50, 51 of FIG. 4 on a suitable schedule such as every four hours. Basic to the operation is to employ tidal current to do the bulk of the work involved in the collection process. The water currents flow into the shroud or cylinder 10 which guides the water through the cone shaped net. Turning vanes inside the cone cause rotation of the cone. As the cone rotates, it filters the water and causes plankton to be collected and held on the outside of the cone shaped net.

After the plankton is collected and removed from the storage units 50, 51, it will then be treated by a drying process so that it can be stored in the form of a powder as in conventional bulk feed storage operations.

It may be desirable to operate the system such that solids are allowed to accumulate for more than one revolution of the cone filter. In the embodiment illustrated, the entire surface of the cone is cleaned each revolution. Where such frequency of cleaning is not desired or necessary, the nozzle 40 may be segmented with an automatically operated selector valve in the nozzle as it leads to the line 38 so that only one portion of the length of the cone 14 would be cleaned during one revolution and the other portion cleaned during a subsequent revolution. More than two sectors could be employed so that a given area of the cone surface could be cleaned every third, fourth, or fifth revolution, depending upon the number of sectors used, and the actuation of the diversion valve. Alternatively, the line 38 may be flexible and a nozzle, used in place of nozzle 39, of limited length and mounted on a track driven to move the nozzle between the tip and the base of the cone 14 at intervals selectable depending upon the desired frequency of unloading the net surface.

Having described the invention in connection with certain specific embodiments thereof, it is to be understood that further modifications may now suggest themselves to those skilled in the art and it is intended to cover such modifications as fall within the scope of the appended claims.

What is claimed is:
1. A plankton harvester comprising:
   a. a surface float,
   b. an open ended flow director tube suspended subsurface from said float and with the fore/aft axis of said tube parallel to tidal flow,
   c. a conical net rotatably mounted in said cylinder with the apex thereof at the mouth of said tube and the base closing the opposite end of said tube to force tidally driven fluid passing through said tube to pass through said net and deposit solids from said fluid on the surface of said net,
   d. structure coupled to said net to rotate said net in response to said flow, and
   e. means including a suction unit having a mouth thereof adjacent to an elongated linear surface portion of said net to remove and store solids from said surface as said net rotates past said mouth.
2. The combination of claim 1 in which said tube is an open ended cylinder coaxial with said conical net.
3. The combination of claim 1 in which said conical net is supported in a conical frame having interiorly located vanes providing said structure for rotation of said net and frame under the force of the flow of fluid therethrough.
4. The combination of claim 1 in which said float is tethered to an anchor to permit said float to change orientation with change in direction of the tide.
5. A plankton harvester comprising:
   a. a surface float adapted to be secured to face tidal flow,
   b. an open subsurface cylinder secured horizontally to said float and with the fore/aft axis of said float parallel to the axis of said cylinder,
   c. a rotatable conical net structure mounted in said cylinder coaxial with said cylinder with the apex thereof at the mouth of said cylinder and the base closing the opposite end of said cylinder to force fluid passing through said cylinder to pass through said net and deposit solids from said fluid on the surface of said net, d. vane structure in said conical structure to rotate the same at a rate dependent upon said flow, e. a powered suction unit adjacent to a linear surface segment of said net to remove solids from said surface as said net rotates thereby, and f. a storage chamber associated with said float and flow coupled to said suction unit to remove and store said solids.

6. A plankton harvester comprising:

a. a surface float anchored for movement in response to tidal flow to face said tidal flow, b. a hollow subsurface cylinder secured horizontally to said float and with the fore/aft axis of said float parallel to the axis of said cylinder, c. conical perforate surface to pass particles below about 80 microns and rotatably mounted coaxially in said cylinder with the apex thereof at the mouth of said cylinder and the base closing the opposite end of said cylinder to force fluid passing through said cylinder to pass through said surface and deposit solids carried by said fluid on said surface, d. vane structure on said surface to rotate said surface from forces developed from said flow, e. a suction unit adjacent to a linear segment of said surface to remove solids from said surface as it rotates past said unit, and f. a storage chamber associated with said float and flow coupled to said suction unit to remove and store said solids.

7. The method of harvesting plankton comprising:

a. directing tidal flow through a perforate surface of a suitable size to deposit plankton thereon as said flow passes through said perforate surface, b. in response to said flow moving said surface periodically, subjecting said surface to suction to unload solids from said surface, and c. storing said solids.

8. The method of harvesting plankton comprising:

a. tethering a surface floatation unit to an anchor for causing said unit to respond to the tide to maintain heading upstream in the tidal flow, b. directing part of said tidal flow in the region of said floatation unit through a surface perforate to arrest travel of plankton thereon, c. under forces developed from said tidal flow moving said surface periodically past an unloading station, d. developing fluid suction at said station to remove said plankton from said surface, and e. storing the plankton removed from said surface.

* * * * *